(12) United States Patent
Furusako et al.

(10) Patent No.: US 8,123,286 B2
(45) Date of Patent: Feb. 28, 2012

(54) VEHICLE SIDE SECTION STRUCTURE

(75) Inventors: Seiji Furusako, Tokai (JP); Hideo Takeda, Hekinan (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/679,460

(22) PCT Filed: Dec. 1, 2008

(86) PCT No.: PCT/JP2008/071821
§ 371 (c)(1),
(2), (4) Date: Mar. 22, 2010

(87) PCT Pub. No.: WO2010/064294
PCT Pub. Date: Jun. 10, 2010

(65) Prior Publication Data
US 2011/0163571 A1    Jul. 7, 2011

(51) Int. Cl.
*B62D 25/02* (2006.01)
(52) U.S. Cl. .................................. 296/203.03; 296/210
(58) Field of Classification Search .................. 296/210, 296/203.03, 203.01, 193.05
See application file for complete search history.

(56) References Cited

U.S. PATENT DOCUMENTS

| | | | |
|---|---|---|---|
| 6,554,350 B2 * | 4/2003 | Takahara | 296/187.05 |
| 7,165,806 B2 * | 1/2007 | Osterberg et al. | 296/203.03 |
| 2008/0122259 A1 | 5/2008 | Matsui | |

FOREIGN PATENT DOCUMENTS

| | | |
|---|---|---|
| CN | 1861434 A | 11/2006 |
| EP | 1 927 533 A1 | 6/2008 |
| JP | 9-076938 A | 3/1997 |
| JP | 10-310082 A | 11/1998 |
| JP | 2001-334957 A | 12/2001 |
| JP | 2006-123742 A | 5/2006 |
| JP | 2008-132923 A | 6/2008 |
| JP | 2008-184024 A | 8/2008 |

OTHER PUBLICATIONS

Office Action issued Sep. 23, 2011 in Chinese Patent Appliction No. 200880107001.9 & translation thereof.

* cited by examiner

*Primary Examiner* — Dennis Pedder
(74) *Attorney, Agent, or Firm* — Kenyon & Kenyon LLP

(57) ABSTRACT

A vehicle side section structure that is capable of a required stiffness and enables a reduction in weight of a roof side section is provided. A roof side rail that structures a vehicle side section structure is provided with: a roof outer panel that has length in a vehicle front-rear direction and is opened inward of the vehicle, and has a pair of upper and lower flanges; and a roof side frame member that is joined to the pair of upper and lower flanges of the roof outer panel at a pair of upper and lower flanges. The roof side frame member has, between the upper and lower flanges, an outward protruding portion that is protruded in a vehicle outward direction and an inward protruding portion 46 that is protruded in a vehicle inward direction, and in a sectional view cut orthogonally to the length direction, a length of a top wall of the outward protruding portion is longer than a length of a top wall of the inward protruding portion.

12 Claims, 9 Drawing Sheets

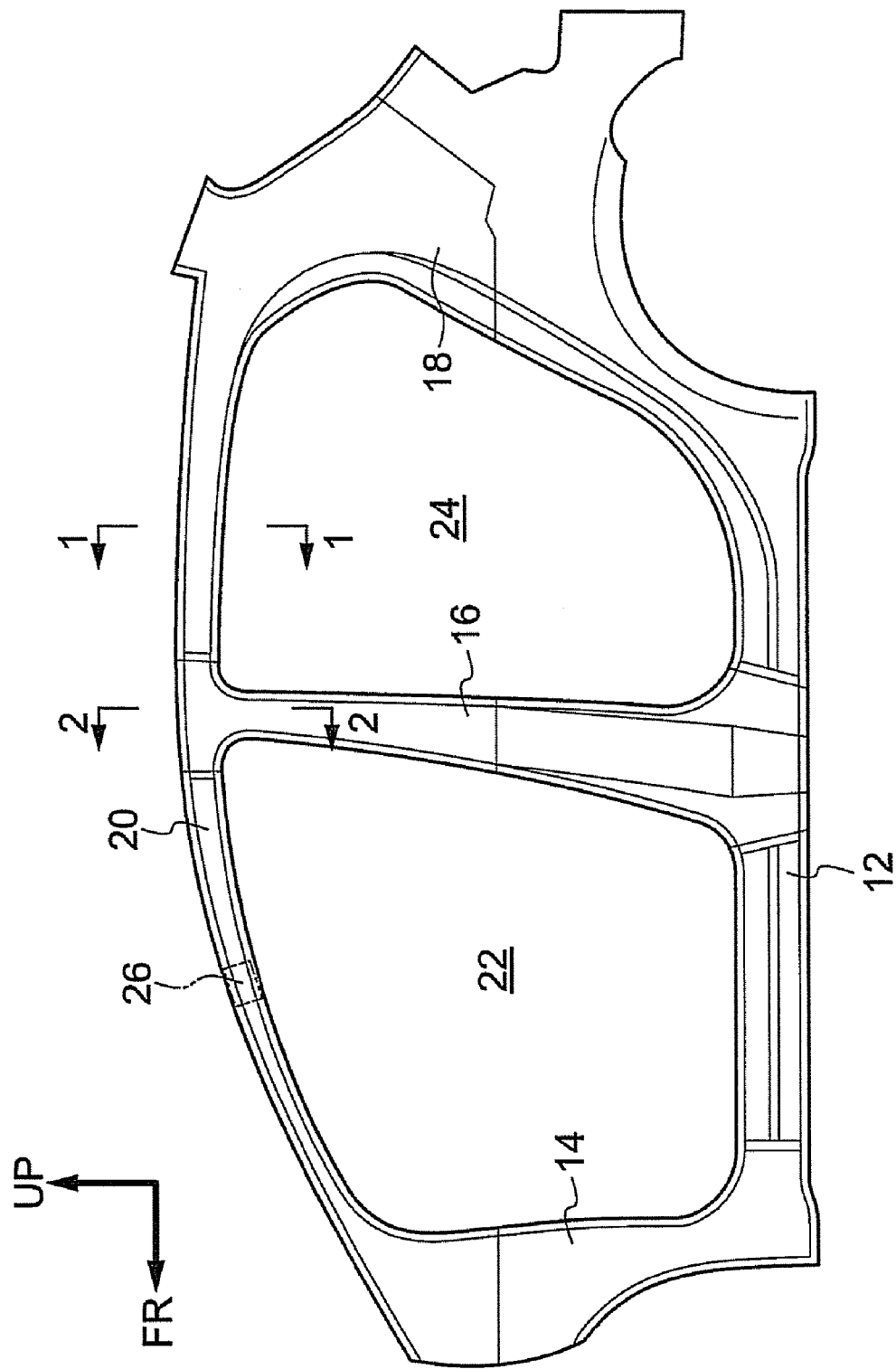

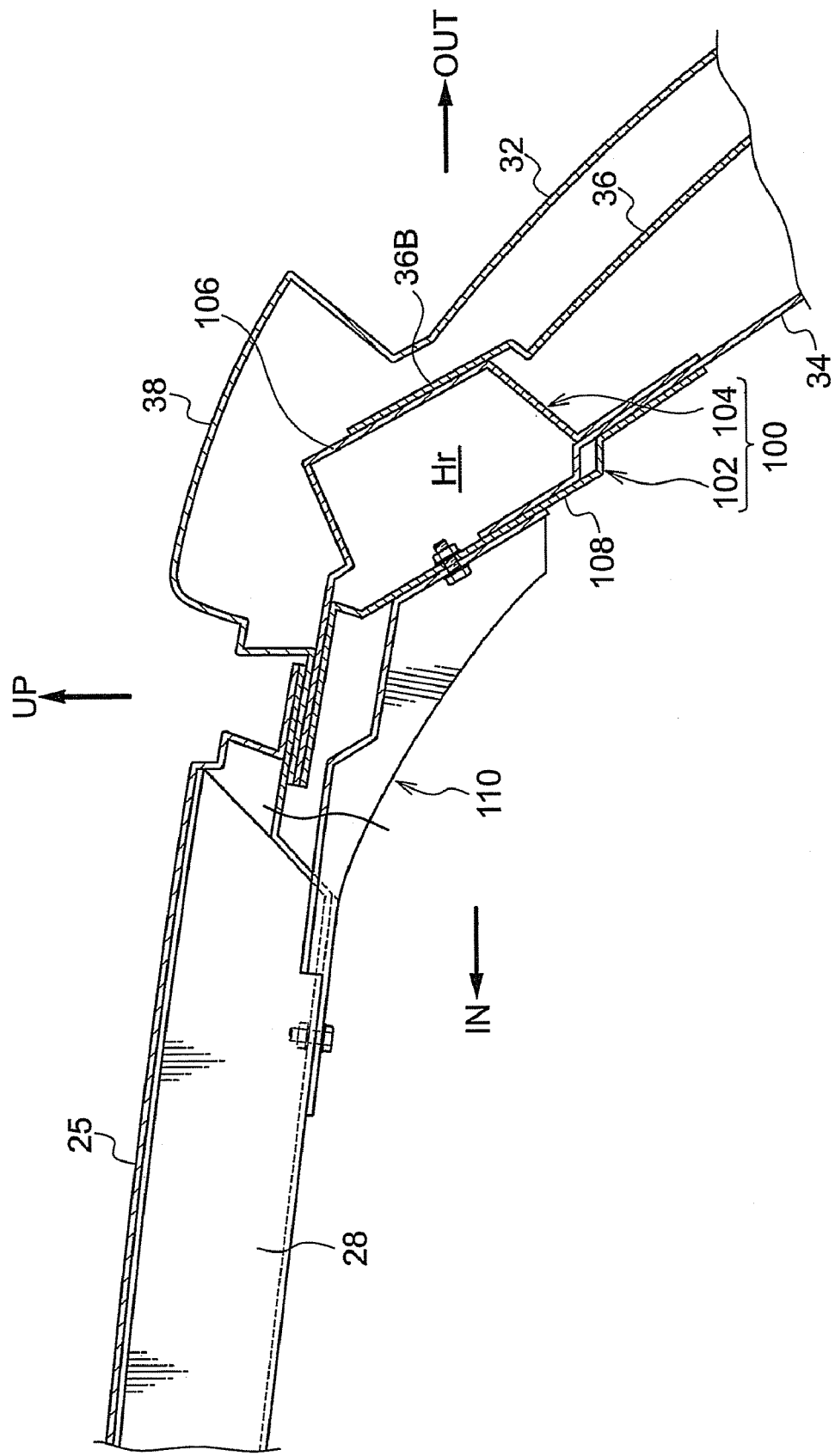

VEHICLE SIDE SECTION STRUCTURE

This is a 371 national phase application of PCT/JP2008/071821 filed 1 Dec. 2008, the content of which is incorporated herein by reference.

FIELD OF THE INVENTION

The present invention relates to a vehicle side section structure.

RELATED ART

A structure is known (for example, see Japanese Patent Application Laid-Open (JP-A) No. 10-310082) in which portions of a cowl side portion, a front pillar portion, a roof side rail portion, a rocker portion and a center pillar portion are formed in a closed cross-section by a side outer panel with a thick-plate and a inner side panel with a thin-plate, and in which reinforcement with a single thin plate is provided inside this closed cross-section.

Also known (for example, see JP-A No. 2001-334957) is a structure in which a front door opening and a rear door opening are formed in a side outer panel and a side inner panel, the side outer panel and side inner panel are joined so as to form a closed cross-section and constitute a side panel, portions of the side panel apart from a rear portion are formed of high tensile strength steel plate, and no reinforcement is needed inside the closed cross-section.

Further known (for example, see Fig. of JP-A No. 9-76938) is a structure in which one end of a roof gusset is joined to a roof reinforcement, and the other end is joined, via a roof side rail inner, to a pillar outer which is constricted up to a portion of joining between the roof side rail inner and a pillar inner.

SUMMARY OF THE INVENTION

Problem to be Solved by the Invention

However, with a roof side section that has a three-component structure with an outer, an inner and a reinforcement, there is a problem of a weight for a strength to be assured increasing. On the other hand, if a component is simply eliminated, there is concern that sufficient strength will not be provided.

An object of the present invention is to provide a vehicle side section structure that is capable of assuring a required strength and that enables a weight reduction of a roof side section.

Method of Solving the Problem

A vehicle side section structure relating to a first aspect of the present invention has a roof side section that includes: an outer side panel member that has length in a vehicle front-rear direction and is opened to inward of the vehicle, and that includes a pair of upper and lower flanges provided extending from both of vehicle up-down direction edge portions of the opening; and a roof side frame member at which an outward protruding portion that is protruded in a vehicle outward direction and an inward protruding portion that is protruded in a vehicle inward direction are formed between a pair of upper and lower flanges, which are joined to the pair of upper and lower flanges of the outer side panel member, and, in a sectional view cut orthogonally to the length direction, a length of a top wall of the outward protruding portion is formed to be longer than a length of a top wall of the inward protruding portion.

According to the aspect described above, the roof side section is structured by the pair of upper and lower flanges of the outer side panel member and the pair of upper and lower flanges of the roof side frame member being joined together. In this roof side frame member, in a sectional view cut orthogonally to the length direction thereof, the length of the top wall of the outward protruding portion is longer than the length of the top wall of the inward protruding portion. Consequently, a centroid of the roof side frame member is closer, in a vehicle inward/outward direction (a direction substantially coinciding with the protrusion direction of the protruding portions), to the top wall of the outward protruding portion than to the top wall of the inward protruding portion.

Therefore, if the roof side frame member is bendingly deformed by a load from outside the vehicle, a stress level at (the top wall of) the outward protruding portion, which is the side that is compressed, is moderated. Meanwhile, the inward protruding portion of the roof side frame member is at the side that is tensed by the bending, and is disposed relatively further from the centroid. Thus, a tensile stress level in accompaniment with the bending may be effectively raised. That is, in the present vehicle side section structure, in response to bending, the roof side frame member including the inward protruding portion causes a relatively large load to be borne at the tension side, which has an advantage in strength over the compression side. Thus, a required strength may be assured without relying on a reinforcing structure such as an additional member, an improvement in material strength or the like.

Thus, in the vehicle side section structure relating to the aspect described above, a necessary strength may be assured and a weight reduction of the roof side section is enabled.

A vehicle side section structure relating to a second aspect of the present invention has a roof side frame member that includes: an outward protruding portion that has length in a vehicle front-rear direction and is protruded in a vehicle outward direction while opening to a vehicle inward direction; an inward protruding portion that has length in the vehicle front-rear direction and is protruded in a vehicle inward direction while opening to a vehicle outward direction, and at which a length of a top wall in a vehicle up-down direction is smaller than a length of a top wall of the outward protruding portion in the vehicle up-down direction; an upper side flange that is extended from an opening edge of either one of the outward protruding portion and the inward protruding portion and that is joined to a vehicle width direction outer end portion of a roof panel; and a lower side flange that is extended from an opening edge of the other of the outward protruding portion and the inward protruding portion and that is joined to a vehicle upper end portion of a center pillar at a middle portion in the length direction.

According to the aspect described above, the roof side frame member is joined to the roof panel at the upper side flange, and is joined to the center pillar at the vehicle front-rear direction middle portion of the lower side flange, and structures the roof side section. In this roof side frame member, the length in the vehicle up-down direction of the top wall of the outward protruding portion is longer than the length in the vehicle up-down direction of the top wall of the inward protruding portion. Therefore, in the roof side frame member, a centroid thereof is closer to the top wall of the outward protruding portion than to the top wall of the inward protruding portion in the vehicle inward/outward direction (the direction substantially coinciding with the protrusion direction of the protruding portions).

Therefore, if the roof side frame member is bendingly deformed by a load from outside the vehicle, a stress level at (the top wall of) the outward protruding portion, which is the compressed side, is moderated. Meanwhile, the inward protruding portion of the roof side frame member is at the side that is tensed by the bending, and is disposed relatively further from the centroid. Thus, a tensile stress level associated with the bending may be effectively raised. That is, in the present vehicle side section structure, in response to bending, the roof side frame member including the inward protruding portion causes a relatively large load to be borne at the tension side, which has an advantage in strength over the compression side. Thus, a required strength may be assured without relying on a reinforcing structure such as an additional member, an improvement in material strength or the like.

Thus, in the vehicle side section structure relating to the aspect described above, a required strength may be assured without relying on high strength materials, and a weight reduction of the roof side section is enabled.

The above aspects may have structures in which the roof side frame member is formed such that the upper and lower flanges are disposed to be closer, in a protrusion direction of the protruding portions, to the top wall of the inward protruding portion than the top wall of the outward protruding portion, and if the length of the top wall of the outward protruding portion in a sectional view cut orthogonally to the length direction is L1 and the length of the top wall of the inward protruding portion is L2, then $1<L1/L2 \leq 5$.

According to the aspect described above, the length of the top wall of the outward protruding portion and the length of the top wall of the inward protruding portion have a ratio R (=L1/L2)>1. Thus, the centroid of the roof side frame member may be made closer to the top wall of the outward protruding portion than to the top wall of the inward protruding portion. Further, by making the ratio $R \leq 5$, a length of the top wall of the inward protruding portion is assured and the required strength is assured without load-bearing at the tension side in response to the aforementioned bending being insufficient. Herein, in a structure in which the inner and outer protruding portions are plural in number, the length L1 may be a total of lengths of plural outward protruding portions and the length L2 may be a total of lengths of plural inward protruding portions.

The above aspects may have structures in which the roof side frame member includes one each of the inward protruding portion and the outward protruding portion, and is structured with the outward protruding portion being disposed at the vehicle upper side relative to the inward protruding portion.

According to the aspect described above, the outward protruding portion that moderates the stress level while undergoing compression as described above is disposed at an upper portion side, which generally receives high compression stress when, for example, a vehicle side impact occurs. Therefore, buckling of the roof side section when a side impact or suchlike is received may be effectively suppressed.

The above aspects may have structures in which the top wall of the outward protruding portion of the roof side frame member is interposed, at a portion in the length direction, between a vehicle outer end side region of a connecting member, which is joined at a vehicle inner end side to a vehicle width direction end portion of a roof reinforcement that reinforces a roof section along the vehicle width direction, and a vehicle upper end side region of a pillar reinforcement that reinforces the center pillar.

According to the aspect described above, the connecting member and the pillar reinforcement are joined sandwiching the top wall of the upper side protruding portion. Therefore, a load that is inputted to the center pillar may be directly transmitted to the roof reinforcement to which the vehicle inner side end of the connecting member is joined.

The above aspects may have structures in which the lower side flange of the roof side frame member is joined to an upper end portion of a pillar inner panel that forms a closed cross-section structure with the pillar reinforcement of the center pillar.

According to the aspect described above, because the pillar reinforcement is joined to the top wall of the upper side protruding portion and the pillar inner panel is joined to the lower side flange, the center pillar is joined to the roof side section with a closed cross-section structure still being maintained. Therefore, in the present vehicle side section structure, a load may be directly and efficiently transmitted from high rigidity portions of the center pillar to the roof reinforcement.

The above aspects may have structures in which the roof side frame member is structured of high tensile strength steel plate.

According to the aspect described above, the roof side frame member may be reduced in thickness with the required strength still being maintained, and a further reduction in weight may be enabled.

Effect of the Invention

The vehicle side section structure relating to the present exemplary embodiment as described hereabove has excellent effects in that a required strength may be assured and a weight reduction of a roof side section is enabled.

BRIEF DESCRIPTION OF THE DRAWINGS

FIG. 4 is a side view of a vehicle body at which the vehicle side section structure relating to the exemplary embodiment of the present invention is employed.

FIG. 10 is a perspective view showing a vehicle side section structure relating to a comparative example of the exemplary embodiment of the present invention.

DETAILED DESCRIPTION

Figure 1:
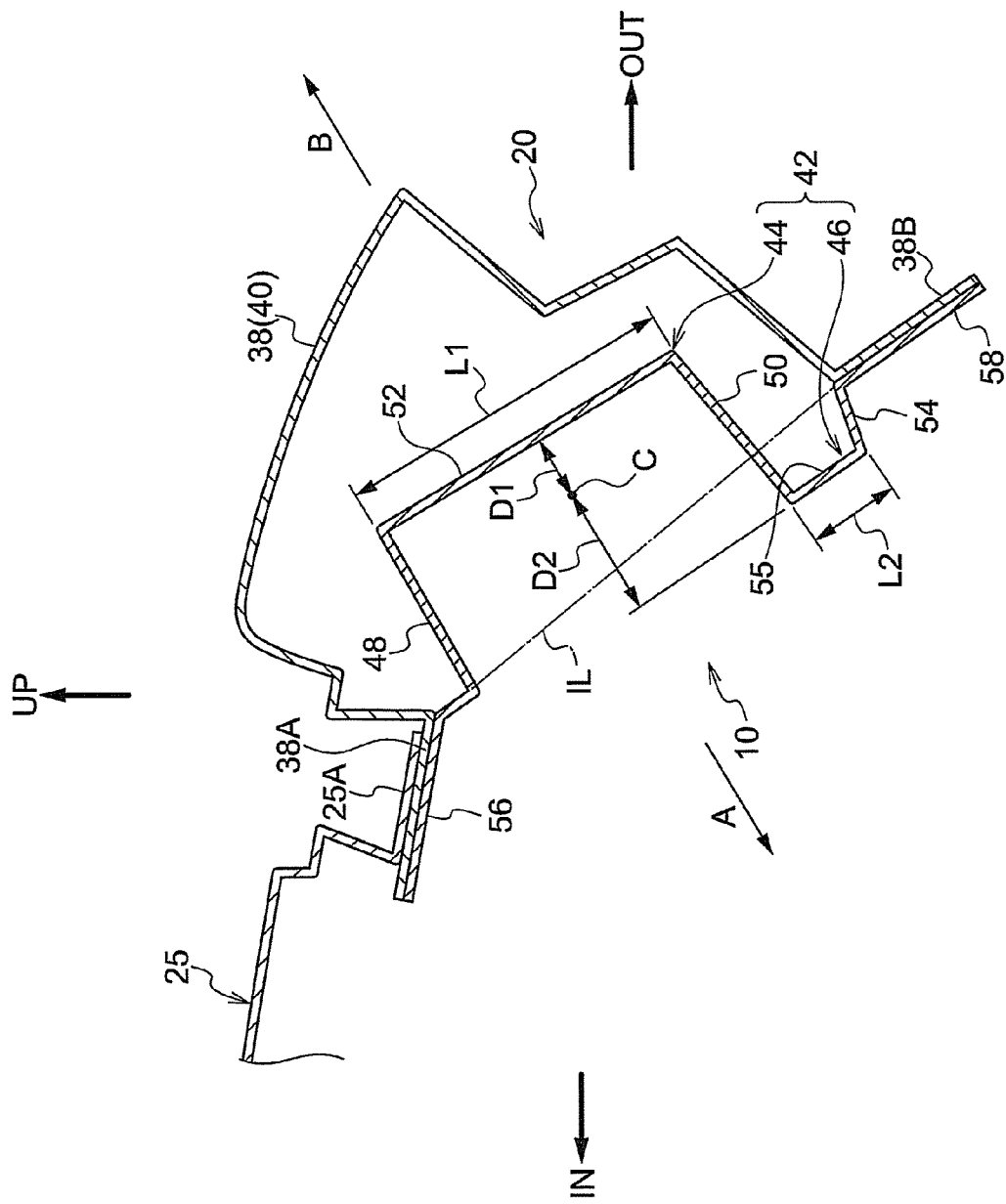
FIG. 1 is a diagram showing a roof side rail that structures a vehicle side section structure relating to an exemplary embodiment of the present invention, and is a sectional diagram cut along line 1-1 of FIG. 4.

A vehicle side section structure 10 relating to an exemplary embodiment of the present invention is described on the basis of FIG. 1 to FIG. 7. Firstly, structures that are prerequisites for application of the vehicle side section structure 10 in an automobile 11 to which the vehicle side section structure 10 is applied are briefly described. Then, principal elements of the vehicle side section structure 10 are described. Herein, the vehicle side section structure 10 is employed at the automobile 11 in a left and right pair. However, because the left and right vehicle side section structures 10 are employed symmetrically with respect to a center line down the middle of a vehicle width direction, basically one of the vehicle side section structures 10 will be described. An arrow FR, labelled as appropriate in the drawings, indicates forward in a vehicle front-rear direction, an arrow UP indicates upward in a vehicle up-down direction, an arrow IN indicates inward in the vehicle width direction and an arrow OUT indicates outward in the vehicle width direction, respectively.

—General Structure of Automobile—

In FIG. 4, a section of the automobile 11 at which the vehicle side section structure 10 is employed is shown in a schematic side view viewed from inside a cabin. As shown in this drawing, the automobile 11 is provided, at the vehicle width direction outer side thereof, with a rocker 12, which is a frame member extending in the vehicle front-rear direction at the vehicle lower end side thereof. A front pillar 14, a center pillar 16 and a rear pillar 18, which are frame members, are erected to extend in the vehicle up-down direction from a vehicle front end portion, middle portion and rear end portion, respectively, of the rocker 12. The automobile 11 is further provided with a roof side rail 20 that serves as a roof side section including a frame member which extends in the vehicle front-rear direction and spans between upper ends of the front pillar 14, center pillar 16 and rear pillar 18.

Thus, in a side section of the automobile 11, a front door aperture portion 22 that is surrounded by the vehicle front portion of the rocker 12, the front pillar 14, the center pillar 16 and the vehicle front portion of the roof side rail 20, and a rear door aperture portion 24 that is surrounded by the vehicle rear portion of the rocker 12, the center pillar 16, the rear pillar 18 and the vehicle rear portion of the roof side rail 20 are formed.

A front roof header 26 that retains the upper edge of an unillustrated windshield glass (see the notional line in FIG. 1) is joined to ends of the center pillar 16 and the roof side rail 20. That is, the front roof header 26 bridges between the ends of the center pillars 16 and roof side rails 20 of the vehicle side section structures 10 that are symmetrically formed at left and right.

Figure 2:
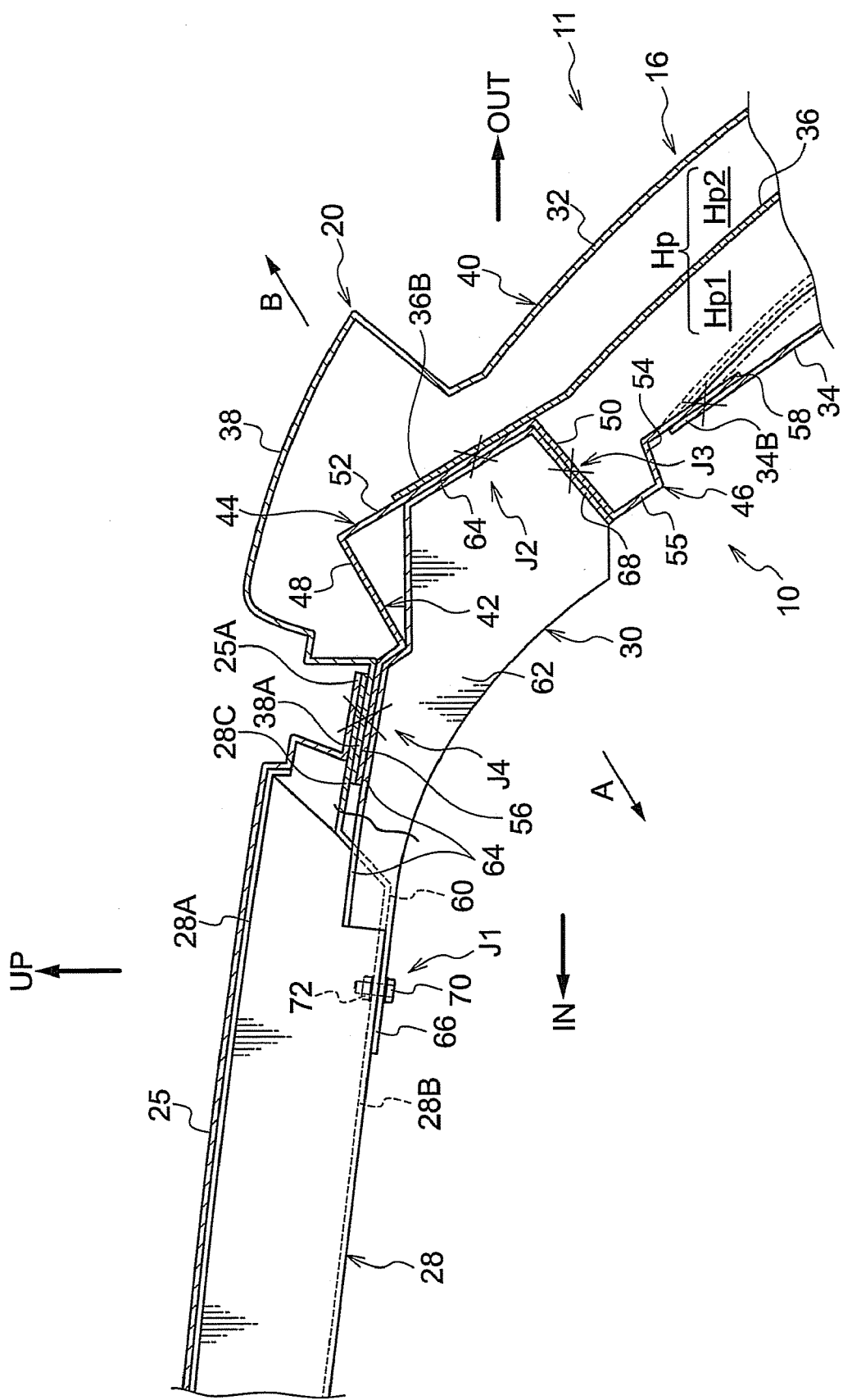
FIG. 2 is a diagram showing the roof side rail that structures the vehicle side section structure relating to the exemplary embodiment of the present invention, and is a sectional diagram cut along line 2-2 of FIG. 4.
Figure 3:
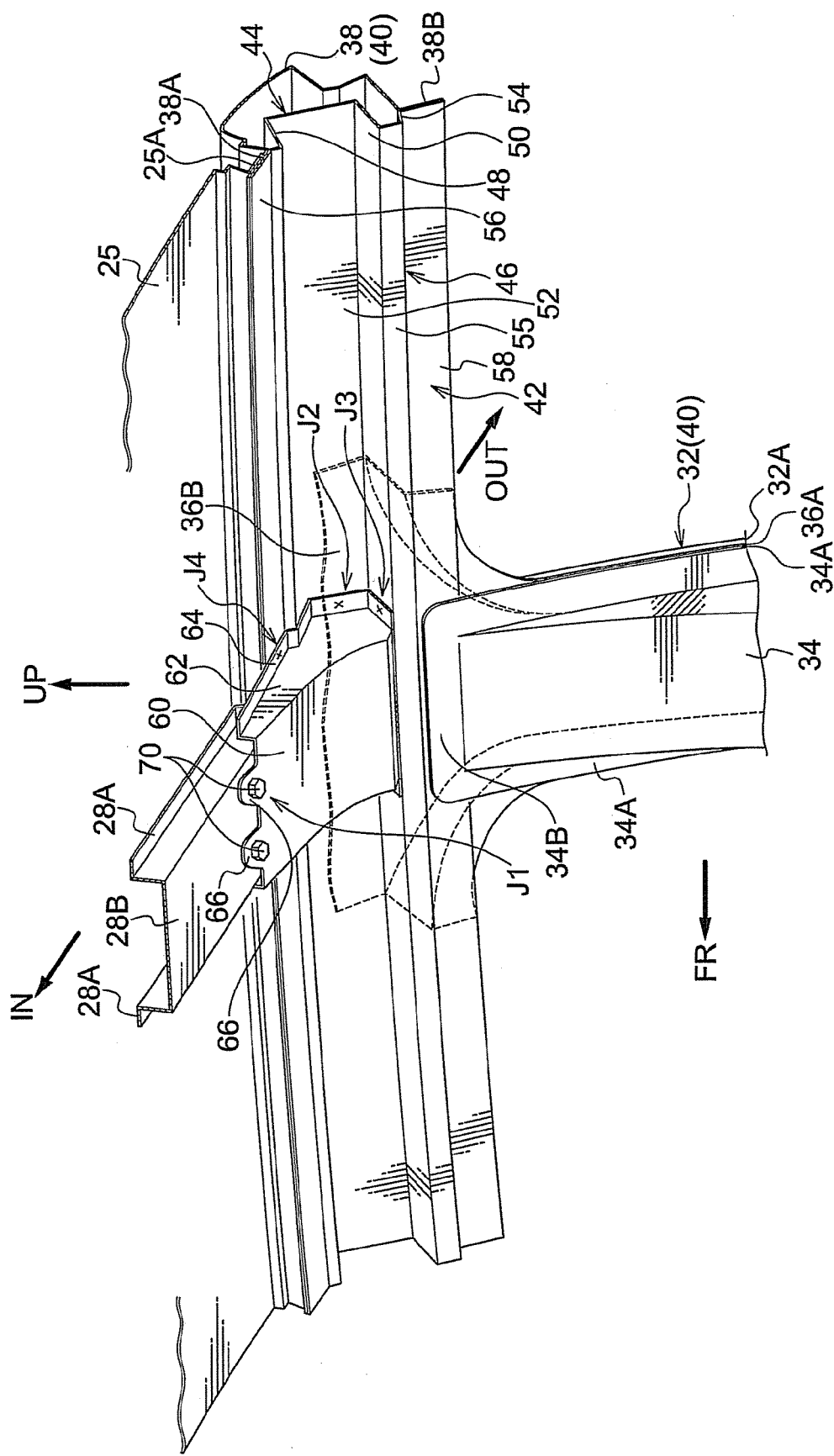
FIG. 3 is a perspective view showing the vehicle side section structure relating to the exemplary embodiment of the present invention.

As shown in FIG. 1 to FIG. 3, a flange 25A is joined to the roof side rail 20. The flange 25A is formed at a vehicle width direction outer end portion of a roof panel 25 that structures the roof of the automobile 11. As shown in FIG. 2 and FIG. 3, a roof reinforcement 28, which extends in the vehicle width direction and reinforces the roof panel 25, is joined to a substantially central portion in the vehicle front-rear direction of the roof panel 25. Specifically, the roof reinforcement 28 forms a hat shape that opens to upward of the vehicle in cross-section, and is joined to the roof panel 25 by a mastic adhesive or the like at flanges 28A, as shown in FIG. 2 and FIG. 3.

As shown in FIG. 2 and FIG. 3, a vehicle width direction end portion of the roof reinforcement 28 and a portion of joining to the center pillar 16 of the roof side rail 20 are connected via a bracket (gusset) 30, which serves as a connecting member that is described in detail hereafter. Herein, the roof reinforcement 28 is common between the left and right vehicle side section structures 10.

Supplementary to the center pillar 16, a pillar outer panel 32 and a pillar inner panel 34, which each forms a hat shape in cross-section, form a closed cross-section structure with a closed cross-section area Hp, which is formed by joining flanges 32A and 34A to one another. The center pillar 16 is provided with a center pillar reinforcement 36 that includes a flange 36A. The flange 36A is sandwiched between and joined to the flanges 32A and 34A of the pillar outer panel 32 and pillar inner panel 34. At the center pillar reinforcement 36, the closed cross-section area Hp is divided into closed cross-section areas Hp1 and Hp2. Thus, the center pillar 16 has a three-member structure, of the pillar outer panel 32, the pillar inner panel 34 and the center pillar reinforcement 36.

Here, the pillar outer panel 32 is formed integrally with an unillustrated outer panel that structures vehicle outside plates of a roof outer panel 38, the rocker 12, the front pillar 14 and the rear pillar 18, and integrally with a side member outer panel 40 that is a large pressed component. The roof outer panel 38 serves as an outer side panel member that covers the roof side rail 20 from the vehicle outer side. The structure in which the roof outer panel 38 and the pillar outer panel 32 are integrally formed is shown in FIG. 2. As shown in this drawing, the roof outer panel 38 extends greatly to the vehicle outer side relative to the pillar outer panel 32.

—Principal Structures of Vehicle Side Section Structure—

As shown in FIG. 1, which shows a cross-section cut along line 1-1 of FIG. 4, and FIG. 2, which shows a cross-section cut along line 2-2 of the same, the roof side rail 20 is structured with a roof side frame member 42 serving as a principal element. The roof side frame member 42 includes an outward protruding portion 44 that opens to the vehicle inner side (see arrow A in FIG. 1 and FIG. 2) and protrudes to the vehicle outer side (see arrow B in FIG. 1 and FIG. 2), and an inward protruding portion 46 that opens to the vehicle outer side and protrudes to the vehicle inner side at a vehicle downward side of the outward protruding portion 44.

More specifically, the roof side frame member 42 includes an outer side top wall 52 that connects between vehicle outward ends of a pair of standing walls 48 and 50 that substantially oppose one another in the vehicle up-down direction, and an inner side top wall 55 that connects between the lower side standing wall 50 and a vehicle inward end of a standing wall 54 that opposes the standing wall 50 from the vehicle downward side thereof. The outward protruding portion 44 is structured by the pair of standing walls 48 and 50 and the outer side top wall 52, and the inward protruding portion 46 is structured by the pair of standing walls 50 and 54 and the inner side top wall 55. That is, in the roof side frame member 42, the standing wall 50 of the standing wall pairs is shared (is formed in substantially the same plane) at boundary portions of the outward protruding portion 44 and the inward protruding portion 46.

The roof side frame member 42 further includes an upper flange 56 that extends from the vehicle inward end of the standing wall 48 which is an edge of an opening at the upper side of the outward protruding portion 44, and a lower flange 58 that extends from the vehicle inward end of the standing wall 54 which is an edge of an opening at the lower side of the inward protruding portion 46.

As shown in FIG. 1 and FIG. 2, the upper flange 56 is joined to both the flange 25A of the roof panel 25 and an upper flange 38A of the roof outer panel 38 (the side member outer panel 40) by spot welding or the like. The lower flange 58 is joined, at a region at which the center pillar 16 is not present as shown in FIG. 1, to a lower flange 38B of the roof outer panel 38 by spot welding or the like. In this state, a closed cross-section structure is formed at the roof side rail 20 by the roof side frame member 42 and the roof outer panel 38.

Meanwhile, as shown in FIG. 2 and FIG. 3, the roof side frame member 42 is joined by spot welding or the like of the lower flange 58 to an upper flange 34B, which is formed at the vehicle upward end of the pillar inner panel 34, at a region of connection between the roof side rail 20 and the center pillar 16. An upper flange 36B, which is formed at the vehicle upper end of the center pillar reinforcement 36, is joined by spot welding or the like from the vehicle outward side to the outer side top wall 52 of the roof side frame member 42 (a later-described joining portion J2). As shown in FIG. 3, the vehicle upper end portion of the center pillar reinforcement 36 is broadened to front and rear so as to form a substantial T shape in side view.

Figure 7A:
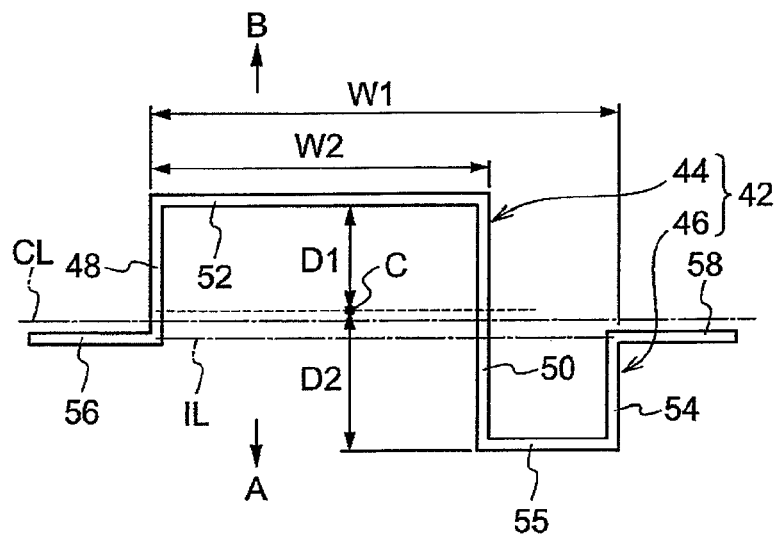
FIG. 7A is a sectional diagram, cut orthogonally to the length direction, showing another analysis model of the roof side frame member that structures the vehicle side section structure relating to the exemplary embodiment of the present invention.

The roof side frame member 42 is formed such that, in a sectional view cut orthogonally to the length direction thereof as shown in FIG. 1, an imaginary line IL, that joins the upper and lower flanges 56 and 58 is positioned closer to the inner side top wall 55 than to the outer side top wall 52. In other words, the roof side frame member 42 is formed such that the upper and lower flanges 56 and 58 are closer to the inner side top wall 55 than the outer side top wall 52 in the vehicle inward/outward direction (see arrow A and arrow B). Further, as shown in FIG. 7A, the imaginary line IL, may be understood as being positioned at the inner side top wall 55 side relative to a center line CL that passes through the middle in the vehicle inward/outward direction between the inner side top wall 55 and the outer side top wall 52.

Formation dimensions of the roof side frame member 42 are determined within ranges such that, if a length of the outer side top wall 52 substantially along the vehicle up-down direction is L1, a length of the inner side top wall 55 substantially along the vehicle up-down direction is L2 and a ratio of these lengths is R (=L1/L2), then the relationship $1 < R \leq 5$ is satisfied. Thus, at the roof side frame member 42, a distance D1 from a centroid C of the roof side frame member 42 to the outer side top wall 52 is shorter than a distance D2 from the centroid C to the inner side top wall 55. That is, in the vehicle side section structure 10, the centroid C of the roof side frame member 42 is positioned closer to the outer side top wall 52 than the inner side top wall 55.

As shown in FIG. 2 and FIG. 3, at the vehicle side section structure 10, the center pillar 16 and the roof reinforcement 28 are connected by the bracket 30 as mentioned above. Specifically, the bracket 30 includes a floor plate 60 that extends in the vehicle width direction, a pair of standing walls 62 that stand from two vehicle front-rear direction ends of the floor plate 60, and upper flanges 64 that protrude in the vehicle front-rear direction from upper edges of the standing walls 62, and the bracket 30 forms a hat shape in cross-section. The bracket 30 further includes an inner flange 66, which extends from a vehicle width direction inner end of the floor plate 60, and outer flanges 68, which protrude in the vehicle front-rear direction from vehicle width direction outer ends of the standing walls 62.

This bracket 30 is joined, at the inner flange 66, to a base plate 28B of the roof reinforcement 28 in a state in which a portion of the floor plate 60 and the inner flange 66 are overlapped with a lower face side of the base plate 28B of the roof reinforcement 28. In this exemplary embodiment, the joining portion J1 between the inner flange 66 and the roof reinforcement 28 is a structure that is fastened by bolts 70 and nuts 72. The inner flange 66 and base plate 28B may be joined using a welding structure such as spot welds or the like instead of this fastening structure.

The bracket 30 is further joined, at a vehicle width direction outer end portion of the upper flanges 64, to the outer side top wall 52 of the roof side frame member 42 from the vehicle inner side. That is, in the vehicle side section structure 10, in a state in which three layers overlap—the upper flanges 64 of the bracket 30, the outer side top wall 52 of the roof side frame member 42 and the upper flange 36B of the center pillar reinforcement 36—the same are joined. In this exemplary embodiment, joining portions J2 of the upper flanges 64, outer side top wall 52 and upper flange 36B are joined by spot welding or the like.

Thus, in the vehicle side section structure 10, the center pillar 16 and the roof reinforcement 28 are connected via the bracket 30 as described above. That is, in the vehicle side section structure 10, the center pillar 16 and the bracket 30 may be understood as being substantially directly joined, with just the outer side top wall 52 that is a flat plate portion of the roof side frame member 42 (the roof side rail 20) interposed therebetween.

Further in the present exemplary embodiment, the bracket 30 is joined, at the outer flanges 68, to the standing wall 50 of the roof side frame member 42 (see joining portion J3 in FIG. 2). The bracket 30 is further joined, near to the vehicle width direction middle of the upper flanges 64, to the flange 25A of the roof panel 25, an outer flange 28C of the roof reinforcement 28, the upper flange 38A of the roof outer panel 38 and the upper flange 56 of the roof side frame member 42 (see joining portion J4 in FIG. 2), at joining portions of the same.

In the vehicle side section structure 10 described hereabove, the roof side frame member 42 is structured by high tensile strength steel plate. The term "high tensile strength steel plate" in this exemplary embodiment means, for example, a steel plate for automobiles whose tensile strength is 350 MPa or more, and may mean a super high tensile strength steel plate whose tensile strength is 590 MIN or more. In this exemplary embodiment, the roof side frame member 42 is structured by a super high tensile strength steel plate whose tensile strength is 1470 MPa.

As hereabove, in the vehicle side section structure 10 the roof side rail 20 has a two-member structure, of the roof outer panel 38 and the roof side frame member 42, and the roof side frame member 42 that is a single member is structured to form a principal element that serves as a frame of the roof side rail 20.

Next, operation of the present exemplary embodiment is described.

In the vehicle side section structure 10 with the structure described above, at a time of a side impact on a region including the center pillar 16 of the automobile 11 at which the vehicle side section structure 10 is employed, or a time of a rollover or the like, a load acts on the roof side rail 20 toward the vehicle inner side (in the direction of arrow A). Bending in the length direction is caused at the roof side rail 20 by this load.

Figure 5A:
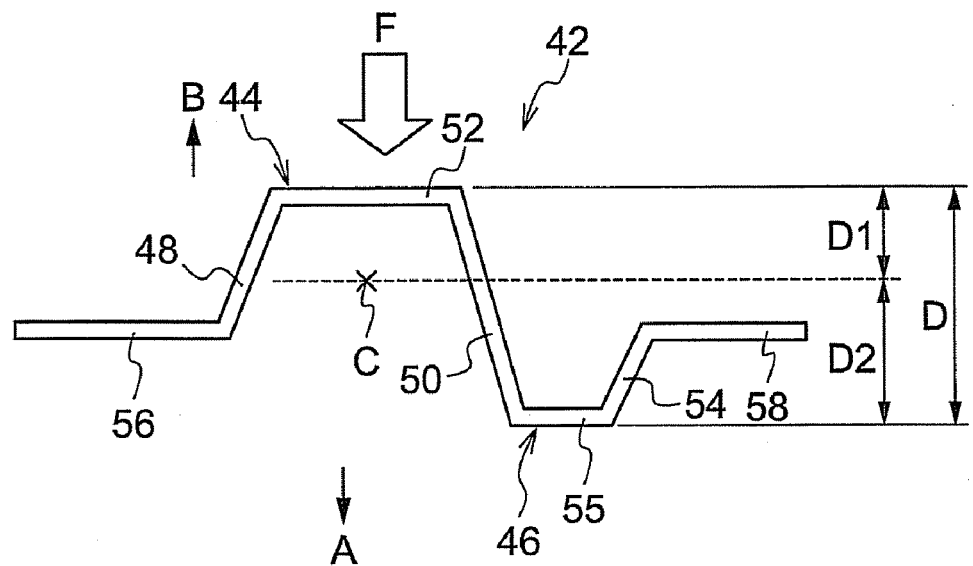
FIG. 5A is a sectional diagram, cut orthogonally to a length direction, showing an analysis model of a roof side frame member that structures the vehicle side section structure relating to the exemplary embodiment of the present invention.
Figure 5B:
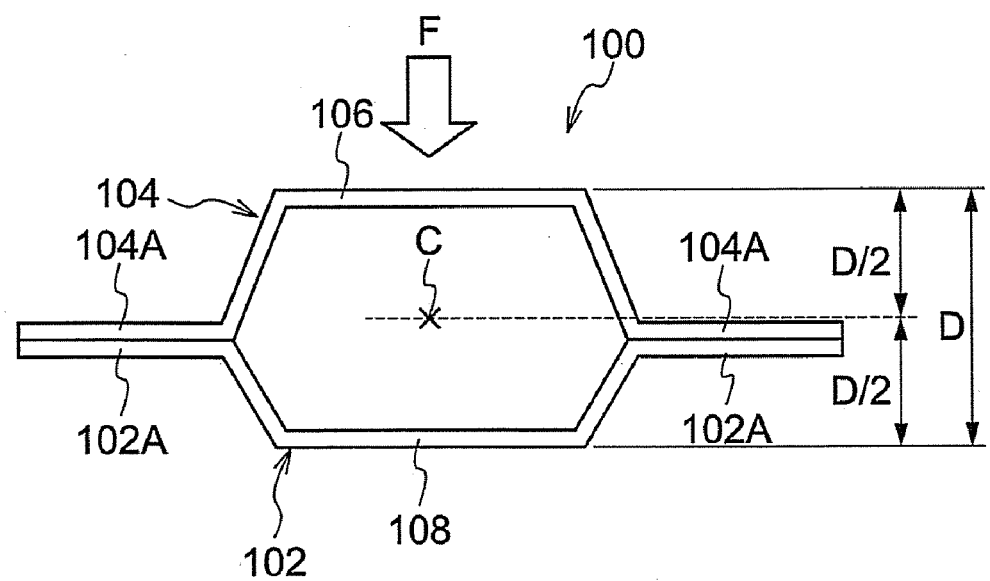
FIG. 5B is a sectional diagram, cut orthogonally to the length direction, showing an analysis model of a roof side frame member relating to a comparative example of the exemplary embodiment of the present invention.

Now, in the vehicle side section structure 10, the roof side frame member 42 that structures the roof side rail 20 is structured to include the outward protruding portion 44 and the inward protruding portion 46. Therefore, in response to the bending caused by the side impact, rollover or the like, sufficient strength with respect to the bending may be provided. Hereafter, this point is described by comparing a model of the roof side frame member 42 that is shown in FIG. 5A (hereinafter simply, referred to as the roof side frame member 42) with a comparative example that is shown in FIG. 5B.

A roof side frame member 100 relating to the comparative example has a closed cross-section structure formed by joining an inner panel 102 and an outer panel 104, respectively with hat shapes in cross-section, to flanges 102A and 104A of one another. Thus, in the roof side frame member 100 relating to the comparative example, a centroid C is positioned at a position about halfway along a distance D between an outer side wall 106 and an inner side wall 108, and distances from the centroid C to the outer side wall 106 and the inner side wall 108 are D/2. The distance D in this comparative example is set to be equal to a distance D (=D1+D2) from the outer side top wall 52 to the inner side top wall 55 of the roof side frame member 42. The inner panel 102 is formed of steel plate with a thickness of 1.2 mm and a tensile strength of 440 MPa, and the outer panel 104 is formed of steel plate with a thickness of 1.8 mm and a tensile strength of 440 MPa.

Figure 6:
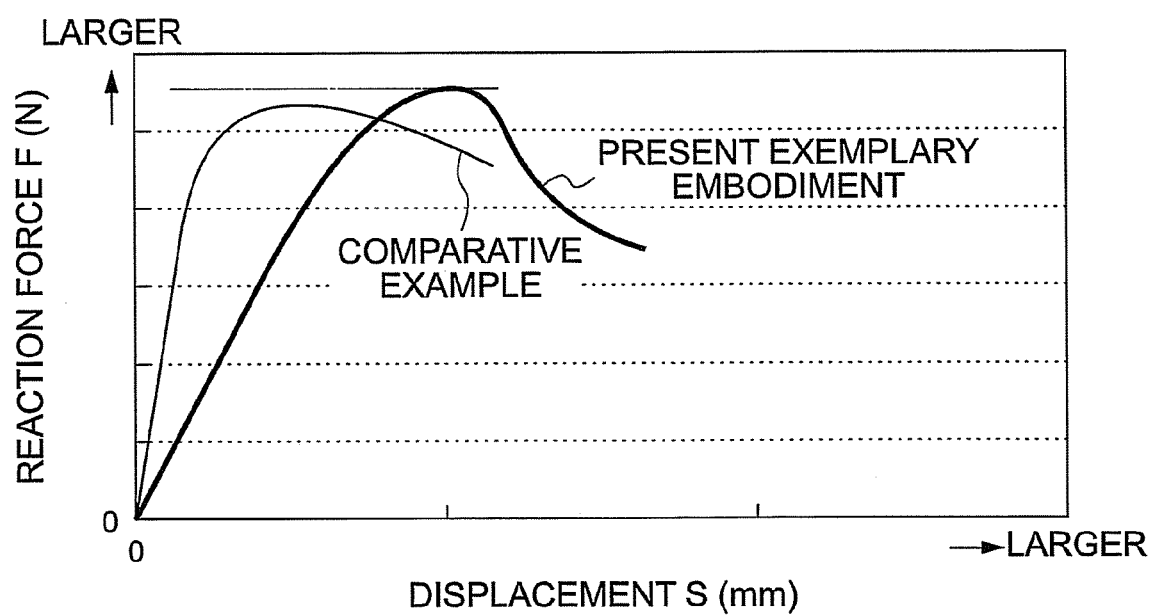
FIG. 6 is a graph showing results of numerical analysis of strengths of the roof side frame members shown in FIG. 5A and FIG. 5B.

FIG. 6 illustrates results of a numerical analysis in which the above-described roof side frame member 42 and roof side frame member 100 are evaluated by a three-point bending test in which a concentrated load F is inputted to the outer side top wall 52 and the outer side wall 106 (the support point separation distance is 800 mm). From this drawing, it is seen that the roof side frame member 42 surpasses the closed cross-section structure roof side frame member 100 in strength (reaction force peak). Herein, the roof side frame member 42 of the present analysis model is formed of super high tensile strength steel plate with a thickness of 1.0 mm and a tensile strength of 1470 MPa. It has been verified that the same effect would be obtained with the roof side frame member 42 being structured of steel plate with a thickness of 1.8 mm and a tensile strength of 440 MPa.

The analysis results shown in FIG. 6 are thought to be due to the roof side frame member 42 being able to wholly bear a high bending load (moment), because of various factors described hereafter. That is, at the roof side frame member 42 that does not have a member corresponding to the inner panel 102, because the centroid C is closer to the outer side top wall 52 (D1<D2), a compression stress level at the outer side top wall 52 that experiences compression during the bending is reduced, and budding of the compression side is suppressed.

Because the roof side frame member 42 includes the inward protruding portion 46, a high tensile stress acts on the inward protruding portion 46. Moreover, the inner side top wall 55 of the inward protruding portion 46 is further separated from the centroid C than the outer side top wall 52. Thus, a tensile stress level of the inward protruding portion 46 associated with the bending may be effectively raised. In other words, in the vehicle side section structure 10, in response to bending, the roof side frame member 42 that has the inward protruding portion 46 bears a relatively large load at the tension side, which has an advantage in strength over the compression side.

In particular, because the ratio R of the lengths of the outer side top wall 52 and the inner side top wall 55 of the roof side frame member 42 is $1<R\leq5$ in the vehicle side section structure 10, a reduction in compression stress at the compression side and raising of the tensile stress level at the tension side in association with the above-mentioned bending exhibit good balance, contributing to a raising of bending strength. That is, the centroid C of the roof side frame member 42 may be made closer to the outer side top wall 52 than the inner side top wall 55 by making the ratio $R>1$. Further, a lower limit of the length L2 of the inner side top wall 55 for which load-bearing by the compression side in response to the bending is guaranteed is defined by making the ratio $R\leq5$, and a required strength is assured.

Figure 7B:
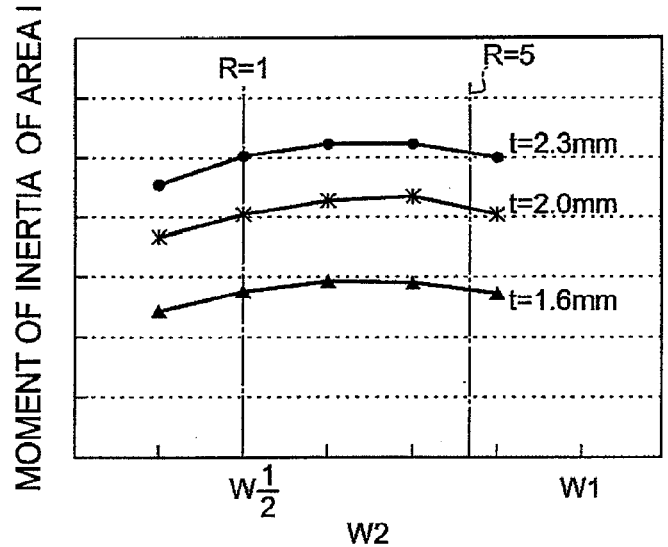
FIG. 7B is a graph showing calculation of moment of inertia of area when a thickness W2 of an outward protruding portion of the analysis model shown in FIG. 7A is varied with a total thickness W1 of the roof side frame member being maintained.
Figure 7C:
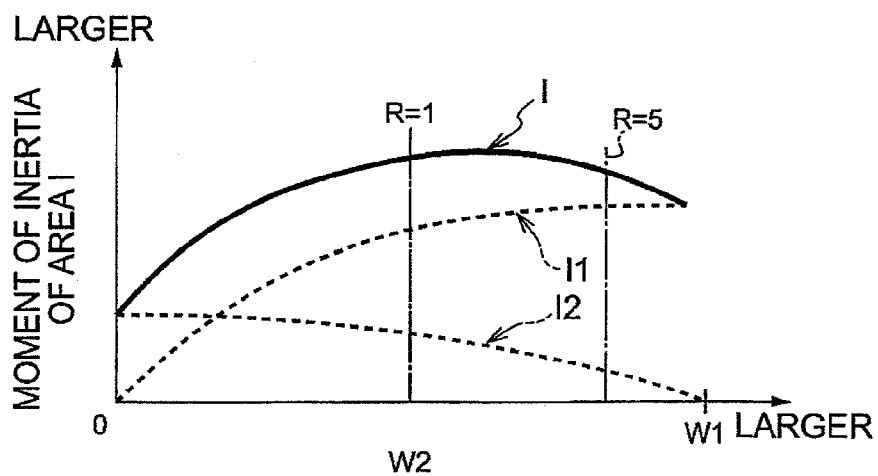
FIG. 7C is a graph showing moment of inertia of area of the outward protruding portion, separated into moment of inertia of area of an inward protruding portion, when the thickness W2 of the outward protruding portion of the analysis model shown in FIG. 7A is varied with the total thickness W1 of the roof side frame member being maintained.

FIG. 7B is a graph showing moment of inertia of area I when a thickness W2 of the outward protruding portion 44 is varied with a combined total thickness W1 of the outward protruding portion 44 and inward protruding portion 46 of the roof side frame member 42 shown in FIG. 7A being maintained. It is known that generally there is a correlation between moment of inertia of area and bending strength. Therefore, from FIG. 7B, it is seen that there is a peak in bending strength of the roof side frame member 42 in the range $1<R\leq5$, regardless of a plate thickness t of the roof side frame member 42. This is also seen from FIG. 7C, which shows a moment of inertia of area I1 due to the outer side top wall 52 and moment of inertia of area I2 due to the inner side top wall 55 separately, for a case in which the thickness W2 of the outward protruding portion 44 is altered while the total thickness W1 of the roof side frame member 42 is kept constant. That is, as the proportion of the width W1 that the width W2 of the outward protruding portion 44 takes up becomes larger, the moment of inertia of area I1 increases while the moment of inertia of area I2 decreases, and there is a peak of the moment of inertia of area I (bending strength) of the roof side frame member 42 in the range $1<R\leq5$ as described above.

Further, in the vehicle side section structure 10, because the outward protruding portion 44 of the roof side frame member 42 is disposed at the vehicle upper side relative to the inward protruding portion 46, buckling is suppressed by the above-described effect of reduction of the compression stress level at a position at which a high compression stress is likely to be received. That is, in the side member outer panel 40 (the automobile 11) in which the roof outer panel 38 protrudes greatly to the vehicle outer side relative to the pillar outer panel 32 as shown in FIG. 2, generally, at a time of side impact or a time of rollover or the like, a higher compression stress is experienced at the roof side rail 20 side than at the center pillar 16 side. Therefore, by disposing the outward protruding portion 44 at the vehicle upper side of the roof side frame member 42 at which a high compression stress is likely to be received, the compression stress is received by the outward protruding portion 44, and tensile stress is borne at the inward protruding portion 46 at the center pillar 16 side, which contributes to a raising of strength of the roof side rail 20 as a whole.

As described above, in the vehicle side section structure 10, the strength of the roof side frame member 42 is excellent relative to the closed cross-section structure roof side frame member 100. Thus, a required strength may be guaranteed without relying on reinforcing members or the like. Therefore, in the vehicle side section structure 10, a member corresponding to the inner panel 102 is not necessary, and a reduction in the number of components and a reduction in weight may be achieved. That is, relative to a comparative example in FIG. 10, which has a three-component structure, of the two-component roof side frame member 100 and the roof outer panel 38, the vehicle side section structure 10 may have a two-component structure, of the roof side frame member 42 and the roof outer panel 38, and a weight reduction is enabled. In particular, because the roof side frame member 42 is structured by high tensile strength steel plate in the vehicle side section structure 10, a further reduction in weight is achieved by reducing the thickness of the roof side frame member 42.

Further here, in the vehicle side section structure 10, the center pillar reinforcement 36 structuring the center pillar 16 and the bracket 30 connected to the roof reinforcement 28 are joined via the outer side top wall 52. Therefore, in the vehicle side section structure 10, a load inputted to the center pillar 16 at, for example, a time of a side impact is transmitted directly to the roof reinforcement 28 (the opposite side from the impact) via the bracket 30.

For example, in the comparative example shown in FIG. 10, the roof side frame member 100 with a closed cross-section area Hr is interposed between a bracket 110 connected to the roof reinforcement 28 and the center pillar reinforcement 36. In this structure, when a high load acts, the load is transmitted from the center pillar 16 to the roof reinforcement 28 by compressive deformation of the roof side frame member 100 (the closed cross-section area Hr). In contrast, in the vehicle side section structure 10, the center pillar 16 and the roof reinforcement 28 may efficiently transmit a high load at a time of side impact from the center pillar 16 to the roof reinforcement 28 without going through a roof side closed cross-section area portion. Therefore, in the vehicle side section structure 10, deformation of the center pillar 16 (displacement to the vehicle inner side) is suppressed.

Moreover, in the vehicle side section structure 10, the pillar inner panel 34 that structures the center pillar 16 is joined to the lower flange 58 of the roof side frame member 42, and the center pillar reinforcement 36 is joined to the outer side top wall 52. Therefore, the vehicle upper end of the center pillar 16 may be joined to be capable of transmitting a load directly to the bracket 30, while maintaining a closed cross-section area of the center pillar 16 (still making use of the capabilities of the closed cross-section area of the center pillar 16). Due to these, in the vehicle side section structure 10, a load may be transmitted from the high stiffness region of the center pillar 16 to the roof reinforcement 28 directly and efficiently.

In the vehicle side section structure 10, for the roof side frame member 42 too, the vehicle upper end of the center pillar 16 that forms the closed cross-section area may be joined to be capable of transmitting a load directly to the bracket 30 while maintaining the cross-sectional form thereof (the outward protruding portion 44 and the inward protruding portion 46).

Further, in the comparative example shown in FIG. 10, the roof side frame member 100 formed by the inner panel 102 and the outer panel 104 is provided. Therefore, there are more plate joining portions, and joining the vehicle width direction outer end of the bracket 110 to the roof side frame member 100 by welding is difficult. In contrast, in the vehicle side section structure 10, the joining portion J2 may be formed by welding the upper flanges 64, the outer side top wall 52 and the upper flange 36B as described above.

From FIG. 6, it is seen that stiffness of the roof side frame member 42 structuring the vehicle side section structure 10 is lower than in the roof side frame member 100. However, with the roof side frame member 100, a stiffness for guaranteeing a required strength in response to bending is excessive. Thus, the reduction in stiffness relative to the roof side frame member 100 of the extent shown in FIG. 6 is not a problem. On the other hand, the roof side frame member 42 has a cross-section second-order moment I in the vicinity of the peaks shown in FIG. 7B and FIG. 7C, due to superimposing the cross-section second-order moment I1 of the outer side top wall 52 (the outward protruding portion 44) and the cross-section second-order moment I2 of the inner side top wall 55 (the inward protruding portion 46). Therefore, the stiffness of roof side frame member 42 may be increased compared to a structure in which the inner panel 102 is simply removed from the outer panel 104, or a structure that does not satisfy $1 < R \leq 5$ even if it has the inward protruding portion 46.

Figure 8:
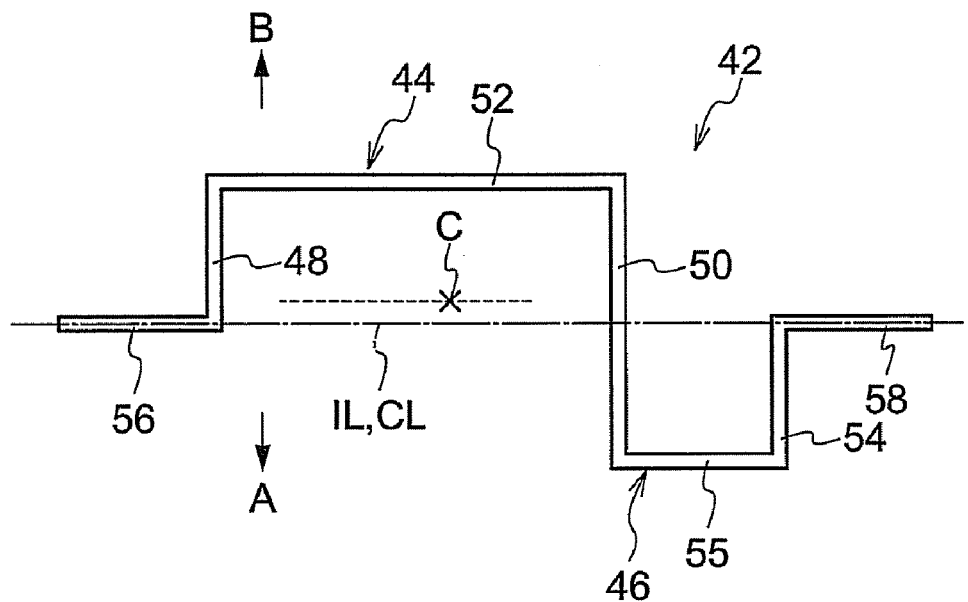
FIG. 8 is a sectional diagram, cut orthogonally to the length direction, schematically showing a first variant example of the roof side frame member that structures the vehicle side section structure relating to the exemplary embodiment of the present invention.
Figure 9:
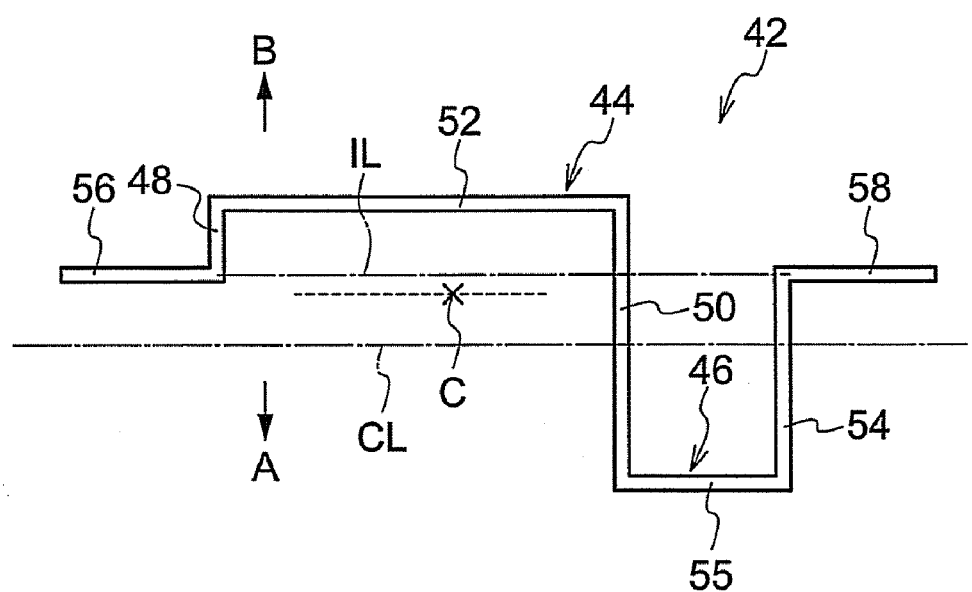
FIG. 9 is a sectional diagram, cut orthogonally to the length direction, schematically showing a second variant example of the roof side frame member that structures the vehicle side section structure relating to the exemplary embodiment of the present invention.

In the exemplary embodiment described above, an example is shown in which the imaginary line IL joining the upper and lower flanges 56 and 58 of the roof side frame member 42 is positioned closer to the inner side top wall 55 than the outer side top wall 52 (is disposed at the inner side top wall 55 side relative to the center line CL shown in FIG. 7A). However, the present invention is not to be limited thus. Therefore, for example, as shown in FIG. 8, a structure is possible in which the imaginary line IL coincides with the center line CL passing through the middle of the outer side top wall 52 and the inner side top wall 55 in the vehicle inward/outward direction, and as shown in FIG. 9, a structure is possible in which the imaginary line IL is positioned closer to the outer side top wall 52 than to the inner side top wall 55 (a structure in which the imaginary line IL is disposed at the outer side top wall 52 side relative to the center line CL).

Further, in the exemplary embodiment described above, an example is shown in which the roof side frame member 42 is formed of high tensile strength steel plate, but the present invention is not to be limited thus. For example, the roof side frame member 42 may be structured of ordinary steel (general steel plate for vehicles). In this case too, the effect of a reduction in weight in association with the removal of a component corresponding to the inner panel 102 may be obtained with the vehicle side section structure 10.

The invention claimed is:

1. A vehicle side section structure comprising a roof side section that comprises:
    an outer side panel member that has a length in a vehicle front-rear direction and is opened to inward of the vehicle, and that includes a pair of upper and lower flanges extending from both of vehicle up-down direction edge portions of the opening; and
    a roof side frame member at which an outward protruding portion having a top wall that protrudes in a vehicle outward direction and an inward protruding portion having a top wall that protrudes in a vehicle inward direction are formed between a pair of upper and lower flanges of the roof side frame member, which are joined to the pair of upper and lower flanges of the outer side panel member, wherein in a sectional view which is orthogonal to a length direction, a length of a top wall of the outward protruding portion is longer than a length of a top wall of the inward protruding portion, wherein said top wall of said outward protruding portion and said top wall of said inward protruding portion are connected by a wall portion which crosses an imaginary line IL that joins upper and lower flanges of said roof side frame member, and wherein the outward and inward protruding portions are formed on a single member.

2. A vehicle side section structure comprising a roof side frame member that comprises:

an outward protruding portion that has a length in a vehicle front-rear direction and protrudes in a vehicle outward direction while opening to a vehicle inward direction;

an inward protruding portion that has length in the vehicle front-rear direction and protrudes in a vehicle inward direction while opening to a vehicle outward direction, and at which a length of a top wall of the inward protruding portion in a vehicle up-down direction is shorter than a length of a top wall of the outward protruding portion in the vehicle up-down direction;

an upper side flange that extends from an opening edge of one of the outward protruding portion or the inward protruding portion and that is joined to a vehicle width direction outer end portion of a roof panel; and a lower side flange that extends from an opening edge of the other of the outward protruding portion or the inward protruding portion and that is joined to a vehicle upper end portion of a center pillar at a middle portion in the length direction, wherein said top wall of said outward protruding portion and said top wall of said inward protruding portion are connected by a wall portion which crosses an imaginary line IL that joins upper and lower flanges of said roof side frame member.

3. The vehicle side section structure according to claim 1, wherein the roof side frame member is formed such that the upper and lower flanges thereof are disposed to be closer, in a protrusion direction of the protruding portions, to the top wall of the inward protruding portion than the top wall of the outward protruding portion, and if, in a sectional view orthogonal to a length direction, the length of the top wall of the outward protruding portion is L1 and the length of the top wall of the inward protruding portion is L2, then 1<L1/L2<5.

4. The vehicle side section structure according to claim 1, wherein the roof side frame member includes one each of the inward protruding portion and the outward protruding portion, and is structured with the outward protruding portion being disposed at a vehicle upper side relative to the inward protruding portion.

5. The vehicle side section structure according to claim 1, wherein the top wall of the outward protruding portion of the roof side frame member is interposed, at a middle portion in a length direction, between a vehicle outer end side region of a connecting member, which is joined at a vehicle inner end side to a vehicle width direction end portion of a roof reinforcement that reinforces a roof section along the vehicle width direction, and a vehicle upper end side region of a pillar reinforcement that reinforces a center pillar.

6. The vehicle side section structure according to claim 5, wherein the lower flange of the roof side frame member is joined to an upper end portion of a pillar inner panel that forms a closed cross-sectional structure with the pillar reinforcement of the center pillar.

7. The vehicle side section structure according to claim 1, wherein the roof side frame member comprises a high tensile strength steel plate.

8. The vehicle side section structure according to claim 2, wherein the roof side frame member is formed such that the upper and lower flanges thereof are disposed to be closer, in a protrusion direction of the protruding portions, to the top wall of the inward protruding portion than the top wall of the outward protruding portion, and if, in a sectional view orthogonal to a length direction, the length of the top wall of the outward protruding portion is L1 and the length of the top wall of the inward protruding portion is L2, then 1<L1/L2<5.

9. The vehicle side section structure according to claim 2, wherein the roof side frame member includes one each of the inward protruding portion and the outward protruding portion, is structured with the outward protruding portion being disposed at a vehicle upper side relative to the inward protruding portion.

10. The vehicle side section structure according to claim 2, wherein the top wall of the outward protruding portion of the roof side frame member is interposed, at a middle portion in a length direction, between a vehicle outer end side region of a connecting member, which is joined at a vehicle inner end side to a vehicle width direction end portion of a roof reinforcement that reinforces a roof section along the vehicle width direction, and a vehicle upper end side region of a pillar reinforcement that reinforces a center pillar.

11. The vehicle side section structure according to claim 10, wherein the lower flange of the roof side frame member is joined to an upper end portion of a pillar inner panel that forms a closed cross-sectional structure with the pillar reinforcement of the center pillar.

12. The vehicle side section structure according to claim 2, wherein the roof side frame member comprises a high tensile strength steel plate.

* * * * *